UNITED STATES PATENT OFFICE.

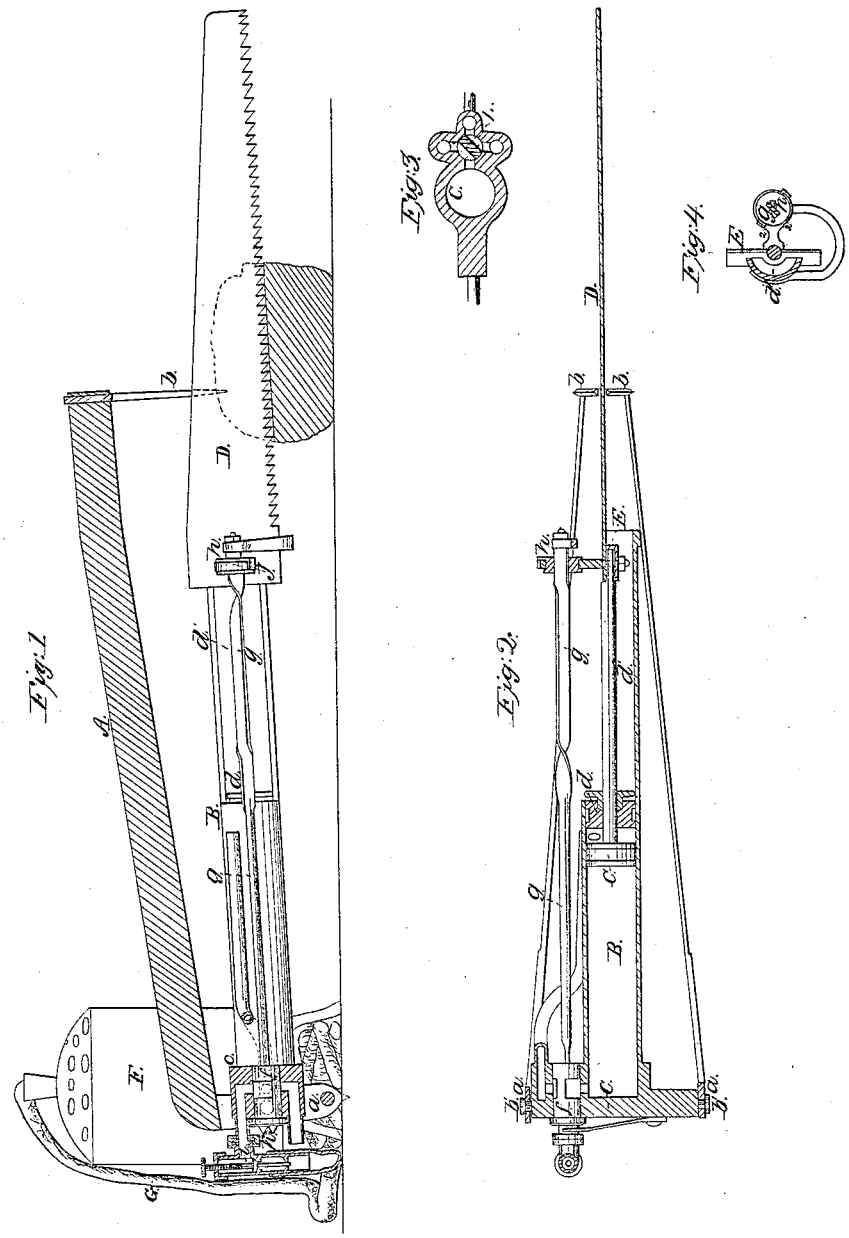

S. R. WILMOT, OF NEW YORK, N. Y.

PORTABLE STEAM SAWING-MACHINE.

Specification of Letters Patent No. 13,444, dated August 14, 1855.

*To all whom it may concern:*

Be it known that I, SAMUEL R. WILMOT, of the city, county, and State of New York, have invented a new and useful portable sawing apparatus to be operated by steam and to be employed in sawing down trees, cutting up logs into short lengths, and for other similar purposes; and I do hereby declare that the following is a full, clear, and exact description of the same, reference being had to the accompanying drawings, forming part of this specification, in which—

Figure 1, is a side view of the apparatus with the valve in section. Fig. 2, is a central longitudinal section at right angles to the plane of the saw. Fig. 3, is a transverse section of the valve and steam passages. Fig. 4, is a section of the valve gear showing also the manner of guiding the saw.

Similar letters of reference indicate corresponding parts in the several figures.

This apparatus consists of an engine of novel construction with a saw attached directly to its piston rod and with a flexible steam pipe to supply it with steam from a boiler. The engine and saw are so constructed as to be capable of working in all positions and may be of such weight as to be carried by one man, so that without moving the boiler, the engine and saw can be carried from place to place around the boiler within a circle whose extent is only limited by the length of the flexible steam pipe.

The apparatus is specially adapted to the purpose of cutting down trees and then cutting them up into logs or pieces of suitable length for transportation and use, and may be used with great advantage in clearing timbered land, for which purpose it will be the most efficient apparatus ever known.

To enable those skilled in the art to make and use my invention, I will proceed to describe its construction and operation.

A is a strong timber having dogs $a\ a\ b\ b$, hooks, or other grappling or holding devices at both ends for the purpose of enabling it to take firm hold of the ground, a tree or any other convenient body. This timber constitutes the main frame of the engine and saw. To one end of this timber or main frame or to suitable standards or to the dogs $a\ a$ secured thereto I attach one end of the cylinder B of the engine by pivots $b^1\ b^1$ in such manner that it may be capable of swinging from a position parallel with the said timber or main frame to a position forming an angle of say from 30° to 60° thereto. To combine strength and lightness I construct the cylinder of a wrought iron tube such as is used for gas and for the flues of steam boilers and fit it with cast iron heads $c\ d$, the former casting also serves to receive or carry the pivots $b^1\ b^1$ and to contain the seat of the steam valve or cock to supply the cylinder. By employing a tube much longer than is required for the working or steam part of the cylinder and cutting away rather more than one half of the extra length in a plane parallel with the axis, the remaining portion $d^1$ of the extra length is made to serve as an efficient guide for the piston C and the saw D; the crosshead E, which is employed to attach the saw to the piston rod being fitted to the said guide as shown in Fig. 4. The saw is arranged with its sides parallel with the direction in which the cylinder is capable of swinging, the swinging movement of the cylinder being for the purpose of feeding and giving a proper range to the saw.

The most convenient method of effecting the induction and eduction of steam to the cylinder is by a four way cock $f$, which is connected concentrically with a rod $g$, which is arranged parallel with the piston rod and made with a feather and fitted to a sliding collar $h$, which fits in a ring $j$, attached rigidly to the piston rod. The rod $g$, is made straight for the greater portion of that part along which the collar $h$, slides when the piston is in motion, but at either end of the said portion it is made spiral so that the collar in sliding along the said spiral parts may turn it and thus change the position of the cock for reversal. The collar $h$, is made capable of turning a little way in the ring $j$, to prevent the rod $g$, being turned by it in passing over the first spiral portion when the stroke of the piston is reversed, the reversal of the valve not being desired to take place till just at the termination of the stroke when the collar reaches the other and spiral part of the rod. The action of the collar $h$, is regulated by two stops 1, 1, carried by itself and two stops 2, 2, on the outside of the ring.

In order to form a steam cushion for the piston to strike against at the end of its stroke, the valve gear is set to admit the steam before the end of the stroke, and a check valve $i$, is fitted to the induction pipe $k$, to close toward the boiler, and as soon as the piston begins to compress the steam before it, this check valve is closed by the pressure being greater between it and the piston than in the boiler, and the steam being thus confined between it and the piston forms an effective cushion. As soon as the momentum of the piston is overcome, the steam expands and drives it back and as soon as the pressure within the cylinder is less than in the boiler the check valve opens and steam passes freely from the boiler to the cylinder.

F, Fig. 1, is the boiler supposed to be at a distance. It is intended to be without setting or furnace in order that it may be made as light and portable as possible, and as fuel will generally be no object where it is employed, as large a fire as is necessary may be made by piling wood under or around it in such manner as may be most convenient.

G, is the flexible steam pipe which may be of vulcanized india rubber, or what is better of strong canvas or cloth coiled and cemented with india rubber, which will possess the strength requisite to stand any ordinary pressure of steam.

The engine will work equally well in any position. When it is employed to cut down a tree the timber A, is placed so as to bring the cylinder at one side of it and the plane of the saw in a nearly horizontal direction. There may be suitable spikes at the end where the cylinder is attached, to enter the ground, and the dogs $b, b$, are driven into the tree by a hammer. The attendant may increase the firmness of the engine by sitting on the timber A. The engine being set in operation, the attendant, with a lever or crow-bar prying lightly between A, and the cylinder, feeds the saw. When it is employed to saw up logs it is placed in the position shown in Fig. 1, with the dogs $a, a$, in the ground, and the dogs, $b, b$, driven into the log. In this position the weight of the cylinder and saw will be sufficient to feed the latter.

By providing the timber A, with two strong dogs $b, b$, one on each side of the saw to drive into the tree or log to be cut, great stability is given to the engine without requiring the parts to be of great weight, and thus preventing their being portable.

What I claim as new and desire to secure by Letters Patent is,

1. The attachment of the opposite end of the steam cylinder to that at which the saw works, by a pivot, to the main frame or bed piece A, of the engine, so that the cylinder may swing to and from the said frame or bed piece for the purpose of allowing the saw a proper range and feeding it substantially as herein described.

2. I claim furnishing the main frame or bed piece A, of the engine with dogs $b, b$, to drive into the tree or log on opposite sides of the saw substantially as herein described whereby great stability is given to the engine and saw when in operation, without making the engine or its frame of great weight.

S. R. WILMOT.

Witnesses:
 EDWD. B. COOK,
 R. G. FAIRBANKS.